UNITED STATES PATENT OFFICE.

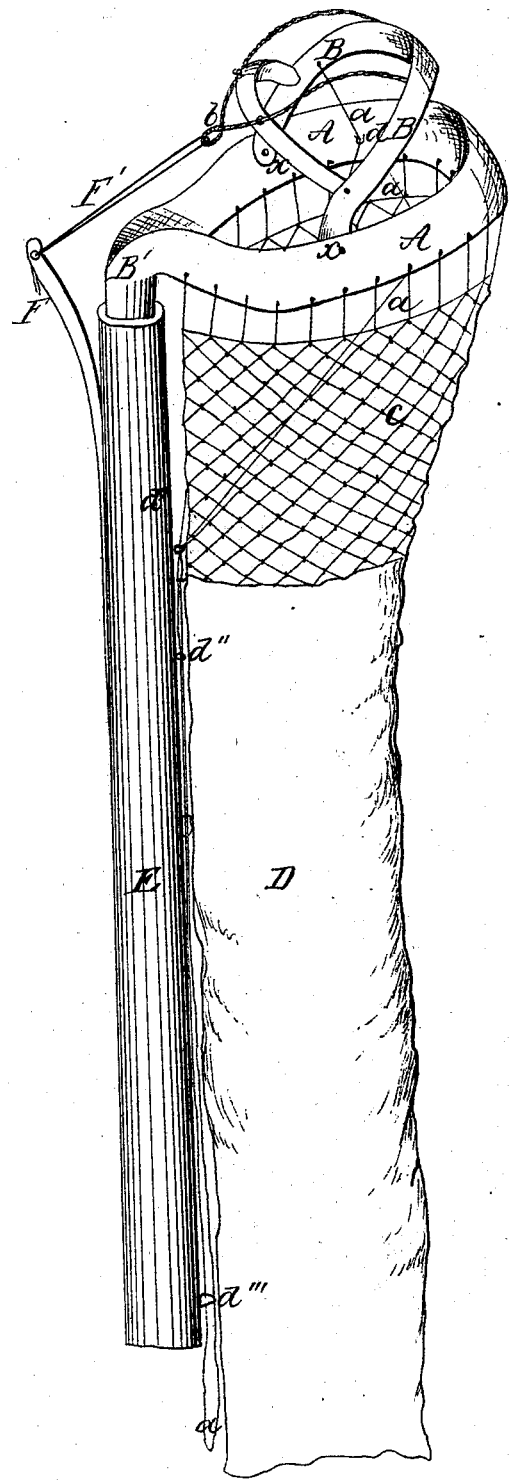

DAVID P. CHAMBERLIN, OF HUDSON, MICHIGAN.

IMPROVEMENT IN FRUIT-GATHERERS.

Specification forming part of Letters Patent No. 26,651, dated January 3, 1860.

*To all whom it may concern:*

Be it known that I, DAVID P. CHAMBERLIN, of Hudson, in the county of Lenawee and State of Michigan, have invented a new and Improved Apparatus for Picking Apples and other Fruit from the Tree; and I hereby declare that the following is a full and exact description thereof, reference being had to the accompanying drawing and references, making a part of this specification.

The drawing hereof represents an elevation of the apparatus somewhat in perspective; and the nature of the invention will be clearly understood from the description seen below.

A A represent the two sides of the lower jaw, B B the two sides of the upper jaw, of the cutters, designed to sever the stems of the fruit.

B' is the shank of the two lower jaws, united together at their base by welding or soldering, or the whole is made of cast metal.

E represents the staff or pole of the apparatus, to be made of sufficient length to correspond with the height of the trees.

C' represents the open-work netting, through which the fruit is seen by the eye of the fruit-gatherer as he stands upon the ground.

D is the bag or sack through which the fruit, when severed from the tree, falls.

F is the spring, which pulls back the upper jaw when the cut of the stem has been effected.

F' is the cord which connects the spring with the wire loop $b$ and thence to the upper edge of the upper jaw.

$a$ $a$ $a$, &c., is the counter-cord, also attached to the upper jaw, but at the lower portion thereof, one part being fastened to the right and another part to the left side of the jaw and on the inner face thereof; thence each of the cords is led down through the space between the upper and lower jaws, but on the inside thereof, and through wire loops $d$ on the inside of the lower jaw; thence through the netting or throat C of the apparatus; thence to loop $d'$ $d''$ $d'''$, till it reaches the hand of the operator. The upper jaw is hinged at $x$ $x$, and vibrates freely on its hinge. The lower jaw, A A, is fixed and projects nearly at right angles to the staff E, the rear portions approximating to each other and uniting by welding, soldering, or otherwise where they enter the staff, the upper portion being sharpened to act as a cutting-edge, and the jaw made of suitable size to admit the largest size fruit, and the throat and hose-pipe must be of a size to correspond thereto. The upper jaw, B B, is hinged sufficiently far back to allow the fruit to be received, and the lower edge is also made a cutting-edge and little smaller than the lower jaw, so as barely to shut within it, so that when the jaws are brought together by pulling on the lower end of cord $a$ the stem of the fruit or any small twig will be severed with the greatest ease. Here it will be remembered that when cord $a$ is left loose spring F, drawing by its own elasticity upon cord F', raises the upper jaw to the desired height for receiving the fruit.

It will be perceived on inspecting the figure that the throat C is drawn in as we descend from the lower jaw till we reach the sack portion. This form is designed for the double purpose of directing the fruit into the sack or hose part, and for allowing a free passage of the light from the fruit, and in this latter respect it serves as a guide to the eye of the fruit-gatherer and enables him to direct the jaws of the apparatus so as to inclose the fruit, and when so inclosed he gives a quick and sudden pull, when the stem is severed and the fruit falls into the throat, and thence into the hose, and thence into the hand or basket of the operator.

I am aware that fruit has been received into a wicker-work basket or other open-work vessel or receptacle; but in no case has the receptacle been used as a guide to direct the fruit by looking through it to find first the position of the fruit and then to direct it into the sack. In all the open-work baskets or wire-net receptacles for receiving and retaining the fruit the accumulation of fruit in the receptacle shuts out the view and thus counteracts and destroys the use I make of my net-work throat C. In my use of the throat it constantly receives the fruit one at a time, and as constantly discharges the first before it receives the second; and as this use of the throat is independent of the operation of the jaws in clipping the fruit, I have thought fit to claim it independently of the said jaws.

The great importance of preserving the stems with the fruit, that there may be no rupture of the skin of the same, is secured in this invention, and all bruises from falling or from pressure are also avoided.

Having thus described the nature of the invention and the mode of using and applying the same, I proceed to state what I claim.

What I claim as my invention, and desire to secure by Letters Patent, is—

The arrangement of the lower jaw at right angles with the shaft, or nearly so, in combination with the open-work throat and the hose-pipe for delivering the fruit at each cutting of the stem, so that the eye of the operator can constantly inspect the fruit at the side of and through the open throat, the whole being arranged and operating in the manner and for the purpose substantially as set forth.

D. P. CHAMBERLIN.

Witnesses:
 A. C. MERCER,
 NOAH BROWN.